United States Patent
Mesrsmid

(10) Patent No.: US 12,174,994 B2
(45) Date of Patent: Dec. 24, 2024

(54) USER DATA COLLECTION PRIVACY USING PROBABILISTIC DATA STRUCTURES

(71) Applicant: Avast Software s.r.o., Prague (CZ)

(72) Inventor: Martin Mesrsmid, Prague (CZ)

(73) Assignee: Avast Software s.r.o., Prague (CZ)

(*) Notice: Subject to any disclaimer, the term of this patent is extended or adjusted under 35 U.S.C. 154(b) by 121 days.

(21) Appl. No.: 17/654,166

(22) Filed: Mar. 9, 2022

(65) Prior Publication Data

US 2023/0289466 A1    Sep. 14, 2023

(51) Int. Cl.
  G06Q 30/02      (2023.01)
  G06F 21/62      (2013.01)
  G06Q 30/0203    (2023.01)

(52) U.S. Cl.
  CPC ..... *G06F 21/6245* (2013.01); *G06Q 30/0203* (2013.01); *G06F 2221/2107* (2013.01); *G06F 2221/2135* (2013.01)

(58) Field of Classification Search
  CPC ......... G06F 21/6245; G06F 2221/2107; G06F 2221/2135; G06Q 30/0203
  See application file for complete search history.

(56) References Cited

U.S. PATENT DOCUMENTS

| | | | | |
|---|---|---|---|---|
| 5,379,422 | A * | 1/1995 | Antoshenkov | G06F 16/2246 |
| 10,055,506 | B2 * | 8/2018 | Rhodes | G06F 16/958 |
| 10,895,985 | B1 * | 1/2021 | Vasquez | G06F 3/064 |
| 11,039,190 | B1 * | 6/2021 | Dailey | H04N 21/26613 |
| 11,061,916 | B1 * | 7/2021 | Ting | G06F 16/24558 |
| 11,381,859 | B1 * | 7/2022 | Dailey | G06F 3/167 |
| 11,403,302 | B1 * | 8/2022 | Ting | G06F 16/26 |
| 11,531,671 | B2 * | 12/2022 | Shmueli | G06N 5/04 |
| 2007/0198439 | A1 * | 8/2007 | Shriraghav | G06Q 30/0283 705/400 |
| 2015/0269178 | A1 * | 9/2015 | Rhodes | G06F 16/958 707/700 |
| 2017/0103417 | A1 * | 4/2017 | Nguyen | G06F 16/24545 |
| 2017/0147646 | A1 * | 5/2017 | Lee | G06F 16/24544 |
| 2017/0286485 | A1 * | 10/2017 | Chandramouli | G06F 16/245 |
| 2021/0004864 | A1 * | 1/2021 | Daub | G06Q 30/0242 |
| 2021/0056108 | A1 * | 2/2021 | Shmueli | G06N 3/08 |

(Continued)

OTHER PUBLICATIONS

University of Chicago Department of Math, "Cardinal and Ordinal Numbers" by James Murphy (Year: 2009).*

(Continued)

*Primary Examiner* — Breffni Baggot
(74) *Attorney, Agent, or Firm* — AVEK IP, LLC; Mark C. Young; William B. Kircher

(57) ABSTRACT

A method of collecting user device data includes receiving a probabilistic cardinality estimator data structure in the user device from a server, the probabilistic cardinality estimator data structure associated with a survey question. An answer to the survey question associated with the probabilistic cardinality estimator data structure is determined, and one or more elements are selectively added to the probabilistic cardinality estimator data structure based on the determined answer to the survey question. The probabilistic cardinality estimator data structure is sent back to the server, which calculates the survey result from the probabilistic cardinality estimator data structure.

20 Claims, 4 Drawing Sheets

(56) References Cited

U.S. PATENT DOCUMENTS

| | | | |
|---|---|---|---|
| 2022/0100960 A1* | 3/2022 | Therani | G06F 40/35 |
| 2022/0342848 A1* | 10/2022 | Singh | G06F 16/188 |
| 2023/0054017 A1* | 2/2023 | Tas | G06F 11/3409 |
| 2023/0069313 A1* | 3/2023 | Sheppard | G06N 7/01 |

OTHER PUBLICATIONS

Konecny, Jakub, et al. Federated Learning: Strategies for Improving Communication Efficiency. arXiv:1610.05492v2 [cs.LG] Oct. 30, 2017.

Cristofaro, Emilano, et al. Fast and Private Computation of Cardinality of Set Intersection and Union. Published in 11th International Conference on Cryptology and Network Security. CANS, 2012.

* cited by examiner

USER DATA COLLECTION PRIVACY USING PROBABILISTIC DATA STRUCTURES

FIELD

The invention relates generally to user privacy in using computerized devices, and more specifically to user data collection privacy using probabilistic data structures.

BACKGROUND

Computers are valuable tools in large part for their ability to communicate with other computer systems and retrieve information over computer networks. Networks typically comprise an interconnected group of computers, linked by wire, fiber optic, radio, or other data transmission means, to provide the computers with the ability to transfer information from computer to computer. The Internet is perhaps the best-known computer network, and enables millions of people to access millions of other computers such as by viewing web pages, sending e-mail, or by performing other computer-to-computer communication.

But, because the size of the Internet is so large and Internet users are so diverse in their interests, it is not uncommon for malicious users to attempt to communicate with other users' computers in a manner that poses a danger to the other users. For example, a hacker may attempt to log in to a corporate computer to steal, delete, or change information. Computer viruses or Trojan horse programs may be distributed to other computers or unknowingly downloaded such as through email, download links, or smartphone apps. Further, computer users within an organization such as a corporation may on occasion attempt to perform unauthorized network communications, such as running file sharing programs or transmitting corporate secrets from within the corporation's network to the Internet.

For these and other reasons, many computer systems employ a variety of safeguards designed to protect computer systems against certain threats. Firewalls are designed to restrict the types of communication that can occur over a network, antivirus programs are designed to prevent malicious code from being loaded or executed on a computer system, and malware detection programs are designed to detect remailers, keystroke loggers, and other software that is designed to perform undesired operations such as stealing passwords or other information from a computer or using the computer for unintended purposes. Similarly, web site scanning tools are used to verify the security and integrity of a website, and to identify and fix potential vulnerabilities.

Security of information, including Personally Identifiable Information (PII) and user profile or behavioral information, is also a challenge for both individual users and for companies that collect user information such as this. Personally Identifiable Information includes not only information such as name, birthdate, social security number, and the like, but also includes information such as biometric or behavioral information that can be used to identify a person. This information can be used to impersonate a user or steal their identity, but is also often used to target advertising or other goods and services to a user. Even the way a user types or interacts with a web page can be unique to a user, and can be used as personally identifiable information to track the user with or without the user's consent.

Rules such as Europe's General Data Protection Regulation (GDPR) have placed limits on what companies can legally do with personal information collected from networked computer users, and what can be done with such information, what types of information can be collected, and similar restrictions. Even when a user consents to their personal or sensitive information being collected, such as behavioral information collected to help improve development of a product, collected data is typically only allowed to be used for a narrowly defined purpose and for a minimum period of time needed to complete the task. The repository of collected user information is further often a target for malicious activity such as theft of personal or sensitive information, and presents additional challenges and responsibilities for the data collector.

Many users do not wish to share their personal or sensitive information with others, desiring instead to maintain their privacy when interacting with various services such as web pages, smart phone apps, and the like. But, computer service providers have a legitimate interest in how users interact with their products, and can use such information to improve their products for usability, features, and the like. Such providers often therefore request that users send them product use information, but many users opt out due to concerns over misuse or theft of any collected personal or sensitive information associated with how they use the product or service.

For reasons such as these, a need exists for a better way of collecting and processing how users interact with such products.

SUMMARY

One example embodiment comprises a method of collecting user device data, including receiving a probabilistic cardinality estimator data structure in the user device from a server, the probabilistic cardinality estimator data structure associated with a survey question. An answer to the survey question associated with the probabilistic cardinality estimator data structure is determined, and one or more elements are selectively added to the probabilistic cardinality estimator data structure based on the determined answer to the survey question. The probabilistic cardinality estimator data structure is sent back to the server, which calculates the survey result from the probabilistic cardinality estimator data structure.

In a further example, the probabilistic cardinality estimator data structure is seeded with a cardinality in the server before being sent from the server to the user device. In another example, at least one element representing the answer to the associated survey question is always added to the probabilistic cardinality estimator data structure, such that the probabilistic cardinality estimator data structure changes irrespective of the determined survey question answer.

The details of one or more examples are set forth in the accompanying drawings and the description below. Other features and advantages will be apparent from the description and drawings, and from the claims.

DETAILED DESCRIPTION

Figure 1:
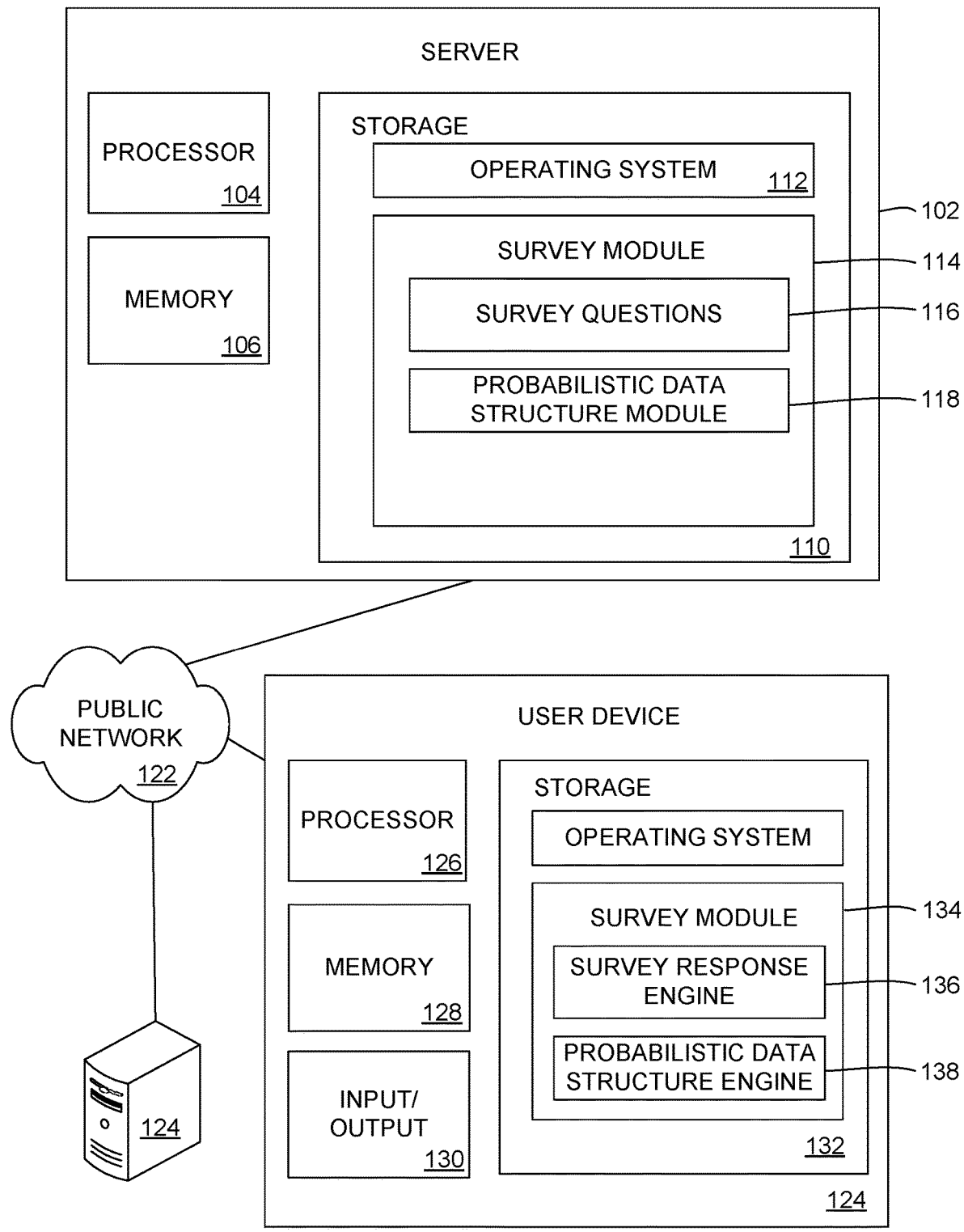
FIG. 1 is a diagram of a server and user device configured to conduct a survey, consistent with an example embodiment.

In the following detailed description of example embodiments, reference is made to specific example embodiments by way of drawings and illustrations. These examples are described in sufficient detail to enable those skilled in the art to practice what is described, and serve to illustrate how elements of these examples may be applied to various purposes or embodiments. Other embodiments exist, and logical, mechanical, electrical, and other changes may be made. Features or limitations of various embodiments described herein, however important to the example embodiments in which they are incorporated, do not limit other embodiments, and any reference to the elements, operation, and application of the examples serve only to define these example embodiments. Features or elements shown in various examples described herein can be combined in ways other than shown in the examples, and any such combinations is explicitly contemplated to be within the scope of the examples presented here. The following detailed description does not, therefore, limit the scope of what is claimed.

Protecting Personally Identifiable Information or PII in particular is legally required to various degrees in some jurisdictions, such as the European Union where the General Data Protection Regulation (GDPR) places limits on collection and use of such information. User data such as name, birthdate, social security number, and the like can be used to impersonate a person or steal their identity, and more private information such as medical history, financial status, or the like may be embarrassing for the user to have made public or have other reasons the user desires information privacy.

Similarly, biometric information or behavioral information such as a user's fingerprint or what activities a user performs when online are desirably kept secret, as they often relate to security of the user's other accounts or to private activity the user does not wish to share with others. Behavioral information and personal identity-related information are both also often used for tracking a user's identity and interests across multiple websites and services while online, such that a user profile can be constructed or the user and implemented in targeting advertising to the user. Because even a user's interactions such as typing, using a mouse, or the way they handle a smartphone can identify a user, protecting a user's personal or sensitive information can be a significant challenge.

Protecting personal or sensitive information is made more complicated because such information is also often used for legitimate purposes, such as where a user's use of a product or service can help the developer improve the product or service, or where a user consents to providing personal or sensitive information for other purposes such as to receive a recommendation, such as when a user wants product recommendations based on their past interests, selections, or purchases. Some regulations have placed limits on what companies can do with personal or sensitive information collected from computer users and what can be done with such information, but these regulations vary significantly between jurisdictions and are rapidly changing. Some companies seek a user's consent (such as by disclosure or click-through acceptance) as to what types of information may be collected, how it may be used, and how long it may be retained, and some jurisdictions have their own restrictions stating that collected data is only allowed to be used for a narrowly defined purpose and for a minimum period of time needed to complete the task. Repositories of collected user information are further often a target for malicious activity such as theft of personal or sensitive information, and present additional challenges and responsibilities for the data collector.

Even collection of simple survey data, such as whether a device has a particular application installed, how the user uses the application, or the number of similar applications installed on the user's device can be considered personal or sensitive information, and subject to personal information protection regulations and terms of use. Conducting such a survey by sending questions and answers back and forth unprotected and storing answers associated with a particular user can subject such personal or sensitive information to unauthorized interception or disclosure, either by monitoring communication to and from end user devices or by taking the information from the server conducting the survey, and introduces an additional burden to the user, typically resulting in a low number of users actually taking the survey.

For reasons such as these, some examples presented herein provide a method of conducting a survey among two or more user devices, including a server that creates a probabilistic data structure to conduct the survey and client devices configured to modify the probabilistic data structure to respond to the survey. In a more detailed example, a server creates a probabilistic cardinality estimator data structure associated with a survey question, and sends it to two or more end user devices. The cardinality estimator estimates the number of distinct elements within a larger set or multiset. The end user devices receive the probabilistic cardinality estimator data structure associated with the survey question from the server, determine the answer to the associated survey question, and selectively add one or more elements to the probabilistic cardinality estimator data structure based on the survey question answer. The end user devices then return the probabilistic cardinality estimator data structure to the server, which receives the probabilistic cardinality estimator data structure and determines the user device answers to the survey question by determining a cardinality of the probabilistic cardinality estimator data structure.

FIG. 1 is a diagram of a server and user device configured to conduct a survey, consistent with an example embodiment. Here, the server 102 includes a processor 104 operable to execute computer program instructions and a memory 106 operable to store information such as program instructions and other data while server 102 is operating. The server exchanges electronic data and receives input from a storage 110 stores program instructions including an operating system 112 that provides an interface between software or programs available for execution and the hardware of the server, and manages other functions. The storage 110 also stores program instructions and other data for a survey module 114, including survey questions 116, and a probabilistic data structure module 118. In this example, the server 102 is also coupled via a public network 122 to one or more user devices 124, such as remote client computers or other smart phones, or other such computerized user devices.

In operation, the server initiates a survey and/or automated data collection of one or more user devices 124 by associating each of one or more survey questions and/or automated data collection definitions 116 with a cardinality estimator data structure such as a HyperLogLog data structure, constructed by probabilistic data structure module 118.

In further examples the probabilistic data structures are pre-seeded with cardinal values that are stored in the server, such as with random numbers, so that intercepting a message containing the probabilistic data structure does not reveal the actual survey count embedded in the data structure. After the probabilistic data structure has been sent to all intended user devices 124 as part of the survey and one or more responses have been received, the probabilistic cardinality estimator 120 estimates the cardinality or number of elements in the data structure, subtracting the stored pre-seeded value to obtain the actual survey result. In a more detailed example, this survey result is compared with a tally of user devices that have responded to the survey, which is counted in various examples using another probabilistic data structure module, a simple counter, or other such method. The resulting cardinality yields the survey result, but does not contain information regarding any user device or the response received from any particular user's device. The messages between the server 110 and the user device 124 are further not meaningfully useful to a third party interceptor, as the probabilistic data structure is pre-seeded with a random value, and in a further example the user device adds at least one element to the probabilistic data structure irrespective of the survey response, making extracting an answer from the user device's received probabilistic data structure vs. reply probabilistic data structure statistically uncertain.

When the user device 124 receives a survey from the server 102, the survey module 134 extracts the probabilistic data structure and associated survey question for each survey question/data structure pair in the survey. The survey response engine determines the answer to the survey question by examining the hardware and/or software of the user device 124, and/or receives input from a user of the user device 124 regarding the survey question. Once the answer to at least one of the survey questions is determined, the survey module 134 encodes the survey response into the probabilistic data structure associated with each respective survey question using probabilistic data structure engine 138, such as by selectively adding one or more hash value elements to each probabilistic data structure.

In a more detailed example, the user device receives the probabilistic data structure and associated survey question for each survey question via a network connection such as input/output 130 from public network 122, where it is subject to interception by other public network computers. To prevent such an intercepting public network computer from observing whether the probabilistic data structure associated with a survey question has changed between the user device 124 receiving the probabilistic data structure and returning it to the server (including returning it via another user device being surveyed), the survey module 134 in some examples changes the probabilistic data structure irrespective of the survey question response, such as adding one random hash element to the probabilistic data structure to represent a "no" and two random hash elements to the probabilistic data structure to represent a "yes" answer. In some such examples, the observer will not be able to determine with certainty whether the change in the probabilistic data structure comprises a single additional entry or two additional entries due to the probabilistic nature of the probabilistic data structure, thereby masking the user's survey answer from an interceptor while still providing a meaningful response to the survey question.

Figure 2:
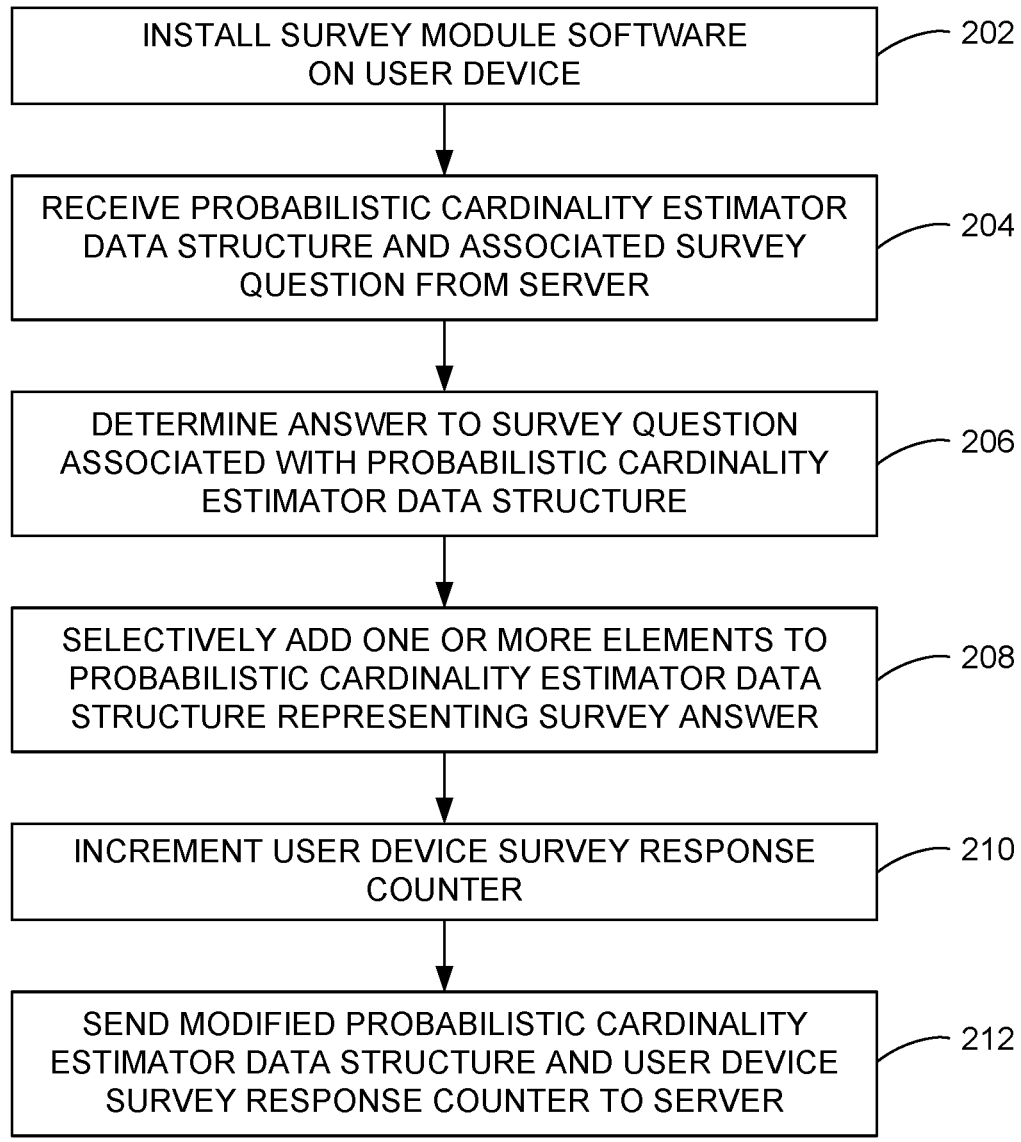
FIG. 2 is a flowchart of a method of a user device participating in a survey, consistent with an example embodiment.

FIG. 2 is a flowchart of a method of a user device participating in a survey, consistent with an example embodiment. At 202, a user device willing to participate in surveys installs a survey module on a user device. In a more detailed example this is a standalone survey application, and in other examples it is a module or portion of another application, such as one in which a user consents as a condition of use of the application to occasional anonymized data collection regarding use of the application and/or the environment in which the application is used. At 204, the user device receives at least one probabilistic cardinality estimator data structure and associated survey question from a server, comprising part of a survey being conducted by an associated server. The user device processes the survey request at 206, determining an answer to the survey question. The survey question in some examples comprises a question about the user's use of the application, such as the number of times the application has been executed, how often the application is executed, how often certain features of the application are used, and the like. In other examples, the survey questions relate to other topics such as the number and/or type of other applications installed, applications most executed on the user device, parameters of the hardware and/or software environment of the user device, and other topics.

When an answer to the survey question has been determined in the survey module (such as via the survey response engine 136 of FIG. 1), the user device selectively adds one or more elements to the probabilistic cardinality estimator data structure at 208. In a simple example, an element such as a random hash value is added to the probabilistic cardinality estimator data structure if the answer is a "yes" or "one" value, and no random hash value is added if the answer is a "no" or "zero" value. In a more sophisticated example, at least one random hash value is always added to the probabilistic cardinality estimator data structure, such as adding a single random hash value if the answer is a "yes" or "one" value, and two random hash values if the answer is a "no" or "zero" value. In the first, simple example, a third party monitoring network traffic into and out of the user device might be able to easily ascertain the user device's answer to the survey question by observing whether the probabilistic cardinality estimator data structure changed before being sent back to the server. In the second example, it is difficult for the third party monitoring network communication of the user device to determine what the survey answer is, as the probabilistic cardinality estimator data structure always changes irrespective of the survey answer, by an amount that varies depending on both the number of random hashes added to the probabilistic cardinality estimator data structure and the random values of the hashes. Because the hash values are random, it is statistically difficult to ascertain with any certainty the number of random hash values added to the probabilistic cardinality estimator data structure, and to thereby determine the individual user device's survey response.

In the example of FIG. 2, a user device survey response counter is also incremented at 210, which the server may use in some examples to calculate the survey results. In some examples, the server message comprising the at least one probabilistic cardinality estimator data structure and associated survey question are sent from the server to a user device, and returned directly from the user device back to the server such as via a public network such as the Internet. In such examples, the server is optionally operable to track the number of user devices that have submitted a survey response. In an alternate example, the server message with the probabilistic cardinality estimator data structure and associated survey question is sent to a user device, and subsequently forwarded from the user device to at least a second user device before being returned to the server, such as where the message contains a list of user devices (or user device addresses or the like) to be included in the survey. In such examples, it may not be clear to the server how many user devices on the list have answered the survey question without a user device survey response counter that is incremented included as part of the server message.

Once the user device's survey response has been encoded into the probabilistic cardinality estimator data structure associated with the survey question and other optional steps such as incrementing a user device survey response counter have been completed in the user device, the user device sends the modified probabilistic cardinality estimator data structure and the user device survey response counter back to the server at 212, either directly such as via a public network (the Internet, a cellular network, etc.) or indirectly such as via another user device on a survey list. The server is then able to use probabilistic cardinality estimator data structure and user device survey response counter to determine a cardinality of the probabilistic data structure and determine the result of the survey.

Figure 3:
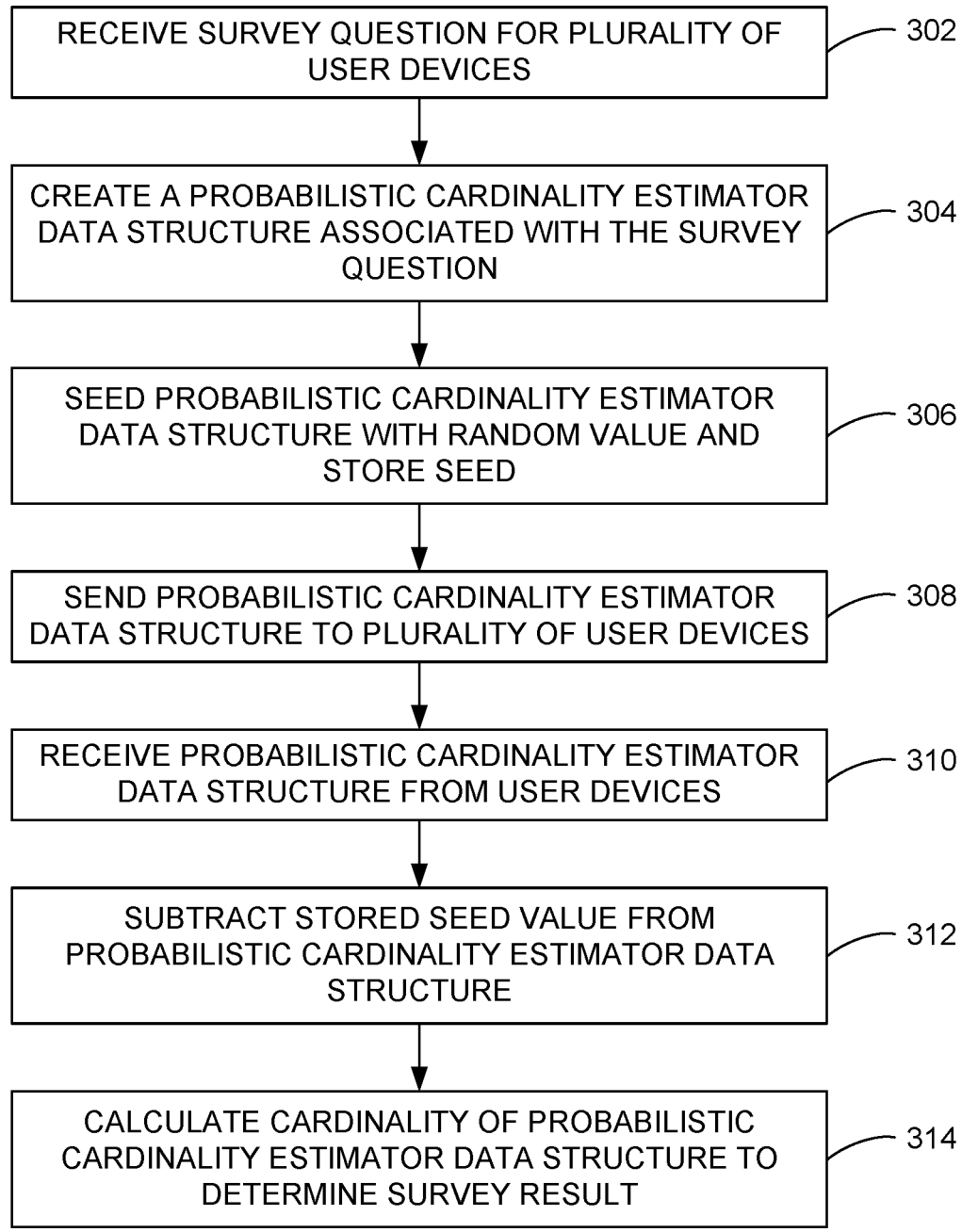
FIG. 3 is a flowchart of a method of a server conducting a user device survey, consistent with an example embodiment.

FIG. 3 is a flowchart of a method of a server conducting a user device survey, consistent with an example embodiment. The server receives a survey question for a plurality of devices at 302, such as from a user configuring a survey. In a more detailed example, the survey question is encoded as instructions for software residing on the user devices to gather the desired survey information. The survey questions may be executable code, encoded instructions readable by executable code on the user devices, or take other forms in various examples. A probabilistic cardinality estimator data structure associated with each survey question that is a part of the survey is created at 304, such as a LogLog, HyperLogLog, HyperLogLog++, or other probabilistic data structure. To prevent an interceptor or user device early in the survey from reading the poll answers, or observing the poll answers relative to one another, a random seed value is added to each of the probabilistic cardinality estimator data structures at 306. The seed is stored so that it can be subtracted from the probabilistic cardinality estimator data structures when the survey is complete, before computing the cardinality of each probabilistic cardinality estimator data structure.

The survey comprising survey instructions and probabilistic cardinality estimator data structures associated with each survey question are sent to two or more user devices at 308, and are received back at 310. The survey in some examples is sent to a single user device which returns the survey to the server, is then sent to the next user device which also returns the survey to the server, etc., until each user device in the survey has received the survey from the server and returned it to the server. This allows the server to keep track of the number of user devices that have responded to the survey, but requires more messages to and from the server than other options. In an alternate example, the survey is sent to a first user device which completes the survey and sends it to a second user device rather than back to the server. The second device can in turn send it to a third user device and so on, until a desired number of user devices encoded in the survey have each received and responded to the survey such that the last user device on the survey list returns the survey to the server. Examples such as this reduce the number of messages to and from the server, but increase the chances that a user device that is not responsive may delay the survey or result in a lost survey message. Further, because the server cannot tell how many times the probabilistic cardinality estimator data structures in the survey have been changed, such surveys also desirably include a survey response counter as discussed at 210 of FIG. 2 to track how many devices have contributed to the survey counts reflected in the probabilistic cardinality estimator data structures.

When the server receives the survey back from the user device or devices at 310, the seed value for each of the probabilistic cardinality estimator data structures in the survey are subtracted from the data structures at 312, such that each probabilistic cardinality estimator data structure reflects a count of elements added by user devices during the survey. The server then calculates the cardinality or count of each probabilistic cardinality estimator data structure at 314, deriving the survey result from the returned survey message.

These examples show how using a probabilistic cardinality estimator data structure to conduct a survey can help protect the privacy of users and user devices while still providing meaningful results. Additional examples such as always changing the probabilistic cardinality estimator data structure when answering a survey question to further mask the response of any one user device, and pre-seeding the probabilistic cardinality estimator data structure with a random value to mask the survey results provide further privacy to the survey participants and the entity conducting the survey. In some example embodiments, the systems, methods, and techniques described herein are performed on one or more computerized systems having various specific components to perform these functions. Such computerized systems are able in various examples to perform the example methods and other such tasks by executing software instructions on a processor, and through use of associated hardware.

Figure 4:
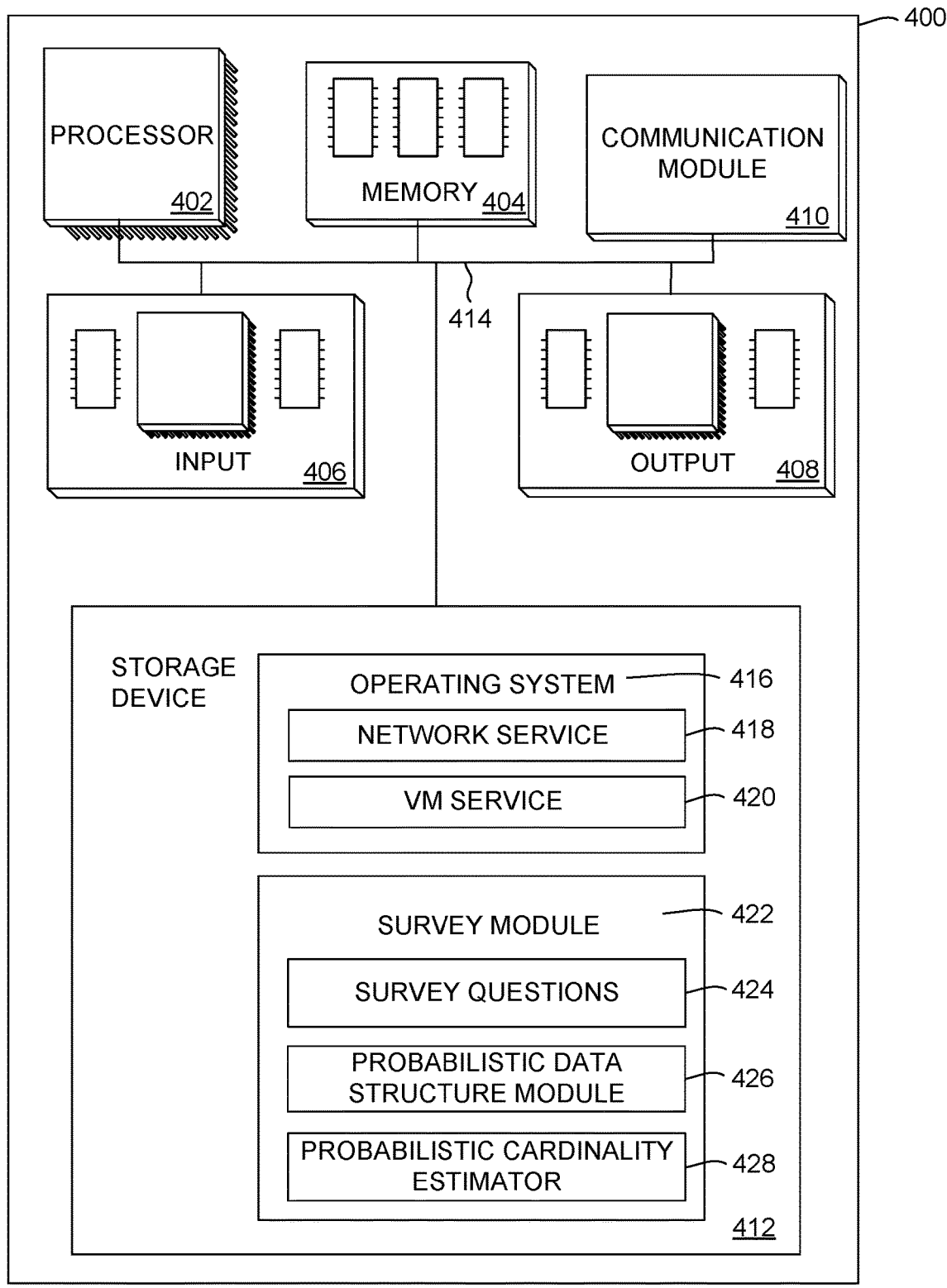
FIG. 4 is computerized system employing a survey module using probabilistic cardinality estimator data structures, consistent with an example embodiment.

FIG. 4 is computerized system employing a survey module using probabilistic cardinality estimator data structures, consistent with an example embodiment. FIG. 4 illustrates only one particular example of computing device 400, and other computing devices 400 may be used in other embodiments. Although computing device 400 is shown as a standalone computing device, computing device 400 may be any component or system that includes one or more processors or another suitable computing environment for executing software instructions in other examples, and need not include all of the elements shown here.

As shown in the specific example of FIG. 4, computing device 400 includes one or more processors 402, memory 404, one or more input devices 406, one or more output devices 408, one or more communication modules 410, and one or more storage devices 412. Computing device 400 in one example further includes an operating system 416 executable by computing device 400. The operating system includes in various examples services such as a network service 418 and a virtual machine service 420 such as a virtual server. One or more applications, such survey module 422 are also stored on storage device 412, and are executable by computing device 400.

Each of components 402, 404, 406, 408, 410, and 412 may be interconnected (physically, communicatively, and/or operatively) for inter-component communications, such as via one or more communications channels 414. In some examples, communication channels 414 include a system bus, network connection, inter-processor communication network, or any other channel for communicating data. Applications such as survey module 422 and operating system 416 may also communicate information with one another as well as with other components in computing device 400.

Processors 402, in one example, are configured to implement functionality and/or process instructions for execution within computing device 400. For example, processors 402 may be capable of processing instructions stored in storage device 412 or memory 404. Examples of processors 402 include any one or more of a microprocessor, a controller, a digital signal processor (DSP), an application specific integrated circuit (ASIC), a field-programmable gate array (FPGA), or similar discrete or integrated logic circuitry.

One or more storage devices 412 may be configured to store information within computing device 400 during operation. Storage device 412, in some examples, is known as a computer-readable storage medium. In some examples, storage device 412 comprises temporary memory, meaning that a primary purpose of storage device 412 is not long-term storage. Storage device 412 in some examples is a volatile memory, meaning that storage device 412 does not maintain stored contents when computing device 400 is turned off. In other examples, data is loaded from storage device 412 into memory 404 during operation. Examples of volatile memories include random access memories (RAM), dynamic random access memories (DRAM), static random access memories (SRAM), and other forms of volatile memories known in the art. In some examples, storage device 412 is used to store program instructions for execution by processors 402. Storage device 412 and memory 404, in various examples, are used by software or applications running on computing device 400 such as biometric signature module 422 to temporarily store information during program execution.

Storage device 412, in some examples, includes one or more computer-readable storage media that may be configured to store larger amounts of information than volatile memory. Storage device 412 may further be configured for long-term storage of information. In some examples, storage devices 412 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 400, in some examples, also includes one or more communication modules 410. Computing device 400 in one example uses communication module 410 to communicate with external devices via one or more networks, such as one or more wireless networks. Communication module 410 may be a network interface card, such as an Ethernet card, an optical transceiver, a radio frequency transceiver, or any other type of device that can send and/or receive information. Other examples of such network interfaces include Bluetooth, 4G, LTE, or 5G, WiFi radios, and Near-Field Communications (NFC), and Universal Serial Bus (USB). In some examples, computing device 400 uses communication module 410 to communicate with an external device such as via public network 122 of FIG. 1.

Computing device 400 also includes in one example one or more input devices 406. Input device 406, in some examples, is configured to receive input from a user through tactile, audio, or video input. Examples of input device 406 include a touchscreen display, a mouse, a keyboard, a voice-responsive system, a video camera, a microphone, or any other type of device for detecting input from a user.

One or more output devices 408 may also be included in computing device 400. Output device 408, in some examples, is configured to provide output to a user using tactile, audio, or video stimuli. Output device 408, in one example, includes a display, a sound card, a video graphics adapter card, or any other type of device for converting a signal into an appropriate form understandable to humans or machines. Additional examples of output device 408 include a speaker, a light-emitting diode (LED) display, a liquid crystal display (LCD), or any other type of device that can generate output to a user.

Computing device 400 may include operating system 416. Operating system 416, in some examples, controls the operation of components of computing device 400, and provides an interface from various applications such as survey module 422 to components of computing device 400. For example, operating system 416, in one example, facilitates the communication of various applications such as survey module 422 with processors 402, communication unit 410, storage device 412, input device 406, and output device 408. Applications such as survey module 422 may include program instructions and/or data that are executable by computing device 400. As one example, survey module 422 uses survey questions 424 and probabilistic data structure module 426 to construct a survey to be completed by user devices that modify generated probabilistic data structures in response to the survey questions, and probabilistic cardinality estimator 428 to estimate the cardinality or result of the returned probabilistic data structures to determine the survey results. These and other program instructions or modules may include instructions that cause computing device 400 to perform one or more of the other operations and actions described in the examples presented herein.

Although specific embodiments have been illustrated and described herein, any arrangement that achieve the same purpose, structure, or function may be substituted for the specific embodiments shown. This application is intended to cover any adaptations or variations of the example embodiments of the invention described herein. These and other embodiments are within the scope of the following claims and their equivalents.

The invention claimed is:

1. A method of maintaining user privacy when collecting user device data, comprising:
   a surveying process, which comprises:
     performing a first encoding of a survey question to create an encoded survey question, wherein performing the first encoding comprises:
       encoding one or more elements of the survey question into a probabilistic cardinality estimator data structure, the probabilistic cardinality estimator data structure being of sufficient complexity that personally identifiable information cannot be ascertained;
     transmitting the encoded survey question from a server to a host of user devices across a network;
     receiving the encoded survey question at each device of the host of user devices, wherein the device decodes the encoded survey question, provides an answer to the survey question, and performs a secondary encoding which encodes both the survey question and the answer into an encoded response, the secondary encoding comprising:
       encoding one or more elements of the survey question and the answer into a probabilistic cardinality estimator data structure, the probabilistic cardinality estimator data structure being of sufficient complexity that personally identifiable information cannot be ascertained; and
     transmitting a plurality of the encoded responses back to the server, where the plurality of encoded responses are decoded and used for improving user device operations; and
   a mass-surveying process, which comprises:

performing the surveying process a plurality of times using a plurality of different survey questions;
exchanging the plurality of different survey questions with one or more hosts of user devices; and
at one or more times during the mass-surveying process, performing a plurality of surveying process steps simultaneously.

2. The method of collecting user device data of claim 1, wherein performing the first encoding further comprises seeding the encoded survey question with a cardinality and storing the seeded cardinality in the server.

3. The method of collecting user device data of claim 2, wherein the seeded cardinality is a random number.

4. The method of collecting user device data of claim 1, wherein the probabilistic cardinality estimator data structure comprises a LogLog, HyperLogLog, or HyperLogLog++ data structure.

5. The method of collecting user device data of claim 1, further comprising a plurality of possible survey questions which collect personal or sensitive user information, wherein each of the possible survey questions has a distinct probabilistic cardinality estimator data structure.

6. The method of collecting user device data of claim 1, wherein performing a plurality of surveying process steps simultaneously during the mass surveying process comprises encoding, decoding, and transmitting a plurality of encoded questions and encoded responses simultaneously.

7. The method of collecting user device data of claim 1, wherein the second encoding further comprises selectively adding one or more probabilistic cardinality estimator data structure elements based on the answer to the survey question, such that the probabilistic cardinality estimator data structure of the encoded response is different from the encoded question irrespective of the answer provided by the user device.

8. The method of collecting user device data of claim 7, wherein the one or more probabilistic cardinality estimator data structure elements count the number of user devices that have responded to the survey question.

9. The method of collecting user device data of claim 7, wherein the one or more probabilistic cardinality estimator data structure elements comprise random hashes.

10. The method of collecting user device data of claim 9, wherein the random hashes are deleted from the user device after being added to the probabilistic cardinality estimator data structure.

11. The method of collecting user device data of claim 1, wherein transmitting encoded responses back to the server further comprises:
transmitting a set of initial encoded responses from an initial set of user devices to at least one other set of user devices, without transmitting the initial set of encoded responses to the server;
the other set of user devices decoding the set of initial encoded responses, such that the other set of user devices can provide a set of updated encoded responses, the set of updated encoded responses comprising the survey question initially asked, the answers provided by the initial set of user devices, and a set of new answers provided by the other set user devices;
continuing to spread encoded responses from one set of user devices to another set, until every device of the host of user devices have provided an answer to the survey question;
creating a final encoded response comprising the survey question and the answers provided by every device; and
transmitting the final encoded response back to the server.

12. A non-transitory computer-readable storage medium storing user device data collection software that, when executed by a processor, causes the processor to perform:
a surveying process, comprising:
performing a first encoding of a survey question to create an encoded survey question, wherein performing the first encoding comprises:
encoding one or more elements of the survey question into a probabilistic cardinality estimator data structure, the probabilistic cardinality estimator data structure being of sufficient complexity that personally identifiable information cannot be ascertained;
transmitting the encoded survey question from the processor to a host of user devices across a network;
receiving the encoded survey question at each device of the host of user devices, wherein the device decodes the encoded survey question, provides an answer to the survey question, and performs a secondary encoding which encodes both the survey question and the answer into an encoded response, the secondary encoding comprising:
encoding one or more elements of the survey question and the answer into a probabilistic cardinality estimator data structure, the probabilistic cardinality estimator data structure being of sufficient complexity that personally identifiable information cannot be ascertained; and
transmitting a plurality of the encoded responses back to the processor, where the plurality of encoded responses are decoded and used for improving user device operations; and
a mass-surveying process, comprising:
performing the surveying process a plurality of times using a plurality of different survey questions;
exchanging the plurality of different survey questions with one or more hosts of user devices; and
at one or more times during the mass-surveying process, performing a plurality of surveying process steps simultaneously.

13. The non-transitory computer-readable storage medium of claim 12, further comprising:
an initial transmission step, wherein the processor is a server which transmits the encoded survey question to one or more first user devices which generate first encoded responses;
a spreading transmission step, wherein the one or more first user devices transmit their encoded response to one or more secondary user devices who generate one or more secondary encoded responses; and
a reply step, wherein all encoded responses are transmitted back to the server processor after the spreading transmission step.

14. The non-transitory computer-readable storage medium of claim 13, wherein the spreading transmission step can be repeated a plurality of times before the reply step, such that every user device that receives an encoded response can generate an individual encoded response to the encoded survey question, and can subsequently transmit the individual encoded response to one or more other user devices over the network.

15. The non-transitory computer-readable storage medium of claim 12, further comprising seeding the encoded survey question with a cardinality before being sent from the processor to the host of user devices, and storing the seeded cardinality.

16. The non-transitory computer-readable storage medium of claim 12, wherein the encoded survey question comprises a LogLog, HyperLogLog, or HyperLogLog++ data structure.

17. The non-transitory computer-readable storage medium of claim 12, wherein at least one of the encoded survey questions or encoded responses comprise personal or sensitive user information.

18. The non-transitory computer-readable storage medium of claim 12, wherein performing the secondary encoding comprises adding one or more elements to the probabilistic cardinality estimator data structure of the encoded response, irrespective of the answer to the encoded question, such that the encoded response always has a distinct data structure.

19. The non-transitory computer-readable storage medium of claim 18, wherein the one or more elements added to the probabilistic cardinality estimator data structure comprise random hashes.

20. A computerized system for maintaining user privacy when collecting user device data, comprising:
 a server and a host of user devices connected via a network, which are configured to execute a series of data collection steps stored in non-transitory computer readable media, the series of data collection steps comprising:
  a surveying process, wherein the surveying process comprises:
   a question selection step, wherein the server selects a survey question;
   a first encoding step to convert the survey question into an encoded survey question, the first encoding step comprising:
    an encoding of one or more elements of the survey question into a probabilistic cardinality estimator data structure, the probabilistic cardinality estimator data structure being of sufficient complexity that personally identifiable information cannot be ascertained; and
    seeding the encoded survey question with a cardinality, and storing the seeded cardinality in the server:
   an initial transmission step, wherein the encoded survey question is transmitted from the server to at least one user device selected from the host of user devices;
   an answer generation step, wherein the at least one user device decodes the encoded survey question, determines an answer, and performs a secondary encoding process, the secondary encoding process comprising;
    an encoding of one or more elements of the survey question and the answer into a probabilistic cardinality estimator data structure, the probabilistic cardinality estimator data structure being of sufficient complexity that personally identifiable information cannot be ascertained;
    adding one or more elements to the probabilistic cardinality estimator data structure of the encoded response, irrespective of the answer to the encoded question, such that the encoded response always has a distinct data structure; and
    adding one or more elements to the probabilistic cardinality estimator data structure of the encoded response, which counts how many user devices have responded to the survey question;
   a user transmission step, wherein the encoded response from the at least one user device is transmitted to at least one other user device which updates the encoded response by including its own answer to the survey question;
   a repeating of the user transmission step a plurality of times until every user device, of the host of user devices, has provided an answer stored in the encoded response;
   a replying step, wherein the encoded response is transmitted back to the server across the network;
   a decoding step, wherein the encoded response is decoded by determining a cardinality of the probabilistic cardinality estimator data structure; and
   an improvement step, where all the answers provided by the host of user devices are used in the improvement of user device operations; and
 a mass-surveying process, the mass-surveying process comprising:
  performing the surveying process a plurality of times using a plurality of different survey questions;
  exchanging the plurality of different survey questions with one or more hosts of user devices; and
  at one or more times during the mass-surveying process, performing a plurality of surveying process steps simultaneously.

\* \* \* \* \*